United States Patent
Katz et al.

(10) Patent No.: US 9,581,697 B2
(45) Date of Patent: Feb. 28, 2017

(54) 3D ZOOM IMAGER

(75) Inventors: Sagi Katz, Yokneam Ilit (IL); Avishai Adler, Kiryat Haim (IL); Giora Yahav, Haifa (IL); David Cohen, Nesher (IL); Eli Larry, Beit She'an (IL); Shlomo Felzenshtein, Nesher (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1073 days.

(21) Appl. No.: 13/356,618

(22) Filed: Jan. 23, 2012

(65) Prior Publication Data

US 2013/0188022 A1 Jul. 25, 2013

(51) Int. Cl.
- H04N 13/02 (2006.01)
- G01S 17/89 (2006.01)
- G01S 17/87 (2006.01)
- G01S 17/10 (2006.01)

(52) U.S. Cl.
CPC .............. *G01S 17/89* (2013.01); *G01S 17/10* (2013.01); *G01S 17/87* (2013.01); *H04N 13/0239* (2013.01)

(58) Field of Classification Search
None
See application file for complete search history.

(56) References Cited

U.S. PATENT DOCUMENTS

| | | |
|---|---|---|
| 4,402,608 A | 9/1983 | DiMatteo et al. |
| 4,627,620 A | 12/1986 | Yang |
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,005,083 A | 4/1991 | Grage et al. |
| 5,101,444 A | 3/1992 | Wilson et al. |

(Continued)

FOREIGN PATENT DOCUMENTS

| | | |
|---|---|---|
| CN | 101254344 B | 6/2010 |
| DE | 102009045600 A1 | 4/2011 |

(Continued)

OTHER PUBLICATIONS

"International Search Report", Mailed Date: Apr. 26, 2013, Application No. PCT/US2013/020693, Filed Date: Jan. 8, 2013, pp. 9.

(Continued)

*Primary Examiner* — Heather Jones
(74) *Attorney, Agent, or Firm* — Gregg Wisdom; Judy Yee; Micky Minhas

(57) ABSTRACT

A 3D imager comprising two cameras having fixed wide-angle and narrow angle FOVs respectively that overlap to provide an active space for the imager and a controller that determines distances to features in the active space responsive to distances provided by the cameras and a division of the active space into near, intermediate, and far zones.

20 Claims, 4 Drawing Sheets

(56) References Cited

U.S. PATENT DOCUMENTS

| | | |
|---|---|---|
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,079,173 B2 | 7/2006 | Jouppi |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,839,429 B2 | 11/2010 | Williams et al. |
| 7,852,262 B2 | 12/2010 | Namineni et al. |

(56) References Cited

U.S. PATENT DOCUMENTS

| | | | |
|---|---|---|---|
| RE42,256 | E | 3/2011 | Edwards |
| 7,898,522 | B2 | 3/2011 | Hildreth et al. |
| 8,004,558 | B2 | 8/2011 | Prechtl et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,872,910 | B1 * | 10/2014 | Vaziri ............................. 348/78 |
| 2008/0026838 | A1 | 1/2008 | Dunstan et al. |
| 2008/0273758 | A1 | 11/2008 | Fuchs et al. |
| 2008/0297587 | A1 | 12/2008 | Kurtz et al. |
| 2009/0128664 | A1 | 5/2009 | He et al. |
| 2009/0321636 | A1 | 12/2009 | Ragucci et al. |
| 2010/0172472 | A1 | 7/2010 | Ermes |
| 2010/0238327 | A1 | 9/2010 | Griffith et al. |
| 2011/0019924 | A1 | 1/2011 | Elgersma et al. |
| 2011/0169922 | A1 * | 7/2011 | Lee ......................... G06T 17/00 348/47 |
| 2011/0169998 | A1 | 7/2011 | Canetti |
| 2011/0285826 | A1 | 11/2011 | Bickerstaff et al. |
| 2011/0299059 | A1 | 12/2011 | Buettgen et al. |
| 2013/0141575 | A1 * | 6/2013 | Lee et al. ...................... 348/148 |

FOREIGN PATENT DOCUMENTS

| | | |
|---|---|---|
| DE | 102009046108 A1 | 5/2011 |
| DE | 102012207328 A1 | 11/2013 |
| EP | 0583061 A2 | 2/1994 |
| JP | 08044490 A1 | 2/1996 |
| JP | 2010206643 A | 9/2010 |
| WO | 93/10708 A1 | 6/1993 |
| WO | 97/17598 A1 | 5/1997 |
| WO | 99/44698 A1 | 9/1999 |
| WO | 2011045277 A1 | 4/2011 |
| WO | 2011/104706 A1 | 9/2011 |

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real-World Disorders", The Washington Post, Mar. 27, 1995, Science Psychology, 2 pages.

"Simulation and Training", 1994, Division Incorporated.

Tonet, et al., "Bioinspired Robotic Dual-Camera System for High-Resolution Vision", IEEE Robotics and Automation Society, IEEE Transactions on Robotics, vol. 24, No. 1, Feb. 2008, pp. 55-64.

Uyttendaele, et al., "Image-Based Interactive Exploration of Real-World Environments", IEEE Computer Graphics and Applications; IEEE Computer Society; May/Jun. 2004, pp. 52-62.

"Supplementary Search Report Received for European Patent Application No. 13740760.7", Mailed Date: May 7, 2015, 3 Pages.

"Office Action Received for European Patent Application No. 13740760.7", Mailed Date: May 21, 2015, 5 Pages.

"First Office Action and Search Report Issued in Chinese Patent Application No. 201380006368.2", Mailed Date: Oct. 10, 2015, 11 Pages.

"Second Office Action and Search Report Issued in Chinese Patent Application No. 201380006368.2", Mailed Date: Jun. 7, 2016, 11 Pages.

* cited by examiner

3D ZOOM IMAGER

TECHNICAL FIELD

Embodiments of the invention relate to cameras that provide zoom functionality.

BACKGROUND

As an object moves farther from a camera, an angle that the object subtends at a photosensor on which the camera images the object decreases, and a size of an image of the object that the camera projects onto the photosensor and a number of pixels in the photosensor covered by the image decreases. With the decrease in image size and number of pixels onto which the image is projected, resolution of the object's features decreases and details of the object may become indiscernible. An optical system of a camera that provides zoom functionality is adjustable so that as an object recedes from the camera it may be "zoomed in" to conserve or increase an angle that the object subtends at the camera photosensor. Zooming in on an object magnifies an image of the object that the camera focuses onto its photosensor and improves resolution of imaged features of the object.

Zoom adjustment for a camera is typically provided by a mechanical system that moves a lens or lenses in the camera's optical system to change the relative positions of the lenses and thereby a focal length of the optical system. The system moves the lenses to provide the camera with a relatively long focal length and a field of view (FOV) characterized by a relatively small view angle to zoom in on an object and magnify an image of the object that the camera acquires. The system moves the lenses to provide the camera with a relatively short focal length and relatively wide-angle FOV to "zoom out" the object, and demagnify the object's image that the camera acquires.

The FOV of a camera is a region of space defined by a solid angle that extends from an optical center of the camera and for which points therein are imaged by the camera's optical system on the camera photosensor. Size of a FOV for most imaging purposes is conveniently measured by horizontal and vertical view angles. The horizontal and vertical view angles are largest angles between two lines that extend from the optical center of the camera, are contained in the FOV, and are coplanar with the camera optical axis in a plane respectively parallel and perpendicular to the ground.

Whereas zooming in magnifies images of objects in a scene that the camera images, it also decreases the view angles of the camera's FOV and as a result decreases a size of the imaged scene, and a portion of an environment surrounding the camera that the camera is able to image. Whereas zooming out demagnifies images of objects in a scene that the camera images, it also increases the view angles of the camera's FOV and as a result increases a size of the imaged scene and a portion of an environment surrounding the camera that the camera is able to image.

For many applications, such as for tracking a person's gestures to interface the person with a computer, it is advantageous that a camera that images the person image the person with an acceptable degree of resolution over a relatively large volume of space, hereinafter referred to as an "active space". For example, to interface a person with a computer game, hereinafter also a full-body, three-dimensional (3D) game, such as a boxing game or a game requiring exercise, that responds to full body motion of the person, it can be advantageous that the camera image the person with acceptable resolution substantially everywhere in the active space. The active space may for example have a "length" that extends from a distance near the camera equal to about 1 m (meters) to a far distance from the camera equal to about 3 m. To provide advantageous image resolution over the length of the active space, the camera optics may be configured for zoom adjustment.

Imaging a person to track the person's gestures or motion during playing a 3D game is advantageously performed using a 3D camera, such as a triangulation or a time of flight (TOF) 3D camera, which acquires distances to features of the person and optionally features of the person's environment. The distances acquired by the 3D camera for the person and optionally the person's environment at a substantially same given time provides a "range image" of a scene comprising the person. 3D cameras are generally active illumination cameras that image a scene with light they generate and configure to determine distances to features in the scene.

A triangulation type 3D camera acquires distances to features in a scene from angles at which the camera images the features from two, generally slightly, different perspectives. The triangulation camera may illuminate the scene with spatially modulated light referred to as "structured light". A time of flight (TOF) 3D camera acquires distances to features in a scene that the camera images by timing how long it takes temporally modulated light that it transmits to travel to the features and back to the camera. The camera transmits the light generally in very short light pulses and images light from the pulses that is reflected by the features that it collects to determine round trip, that is "back and forth", travel times for light.

Providing a 3D camera with zoom optics is generally both technically and cost-wise challenging.

SUMMARY

An embodiment of the invention relates to providing a 3D imaging system, hereinafter also referred to as a "3D imager", comprising a first 3D camera having a wide-angle FOV that overlaps at least a portion of a narrow-angle FOV of a second 3D camera. The FOVs of the first and second 3D cameras define an active space of the 3D imager. The 3D imager comprises a processor programmed with an executable instruction set for implementing an algorithm that provides a range image of features in the active space responsive to distance information provided by the first and second 3D cameras.

In accordance with an embodiment of the invention, the algorithm determines distances to features in a first "near region" of the active space relatively near to the 3D imager responsive to distances determined by the first 3D camera, hereinafter also referred to as a "near camera". The algorithm determines distances to features in a second "far region" of the active space relatively far from the 3D imager responsive to distances determined by the second 3D camera, hereinafter also referred to as a "far camera". Distances to features in a third, "overlap" region of the active space where the FOVs of the near and far 3D cameras overlap are determined using distance information provided by both 3D cameras.

In an embodiment of the invention, the near and far 3D cameras comprise near and far TOF 3D cameras respectively, hereinafter also referred to as near and far TOF cameras. A pixel in the near or far TOF camera acquires an image, hereinafter also a "distance image", that provides a measure of distance from the TOF camera of a feature in the active space that is imaged on the pixel. In accordance with an embodiment of the invention, the algorithm provides a method of correlating pixels in the TOF cameras to determine which pixels in the near or far TOF camera image a substantially same feature of the active space that is imaged by pixels in the far or near TOF camera respectively. The correlation is performed responsive to distance information that distance images acquired by the pixels provide. Optionally, the correlation is performed by maximizing a probability distribution that the pixels in the different TOF cameras image a same feature in the active space.

In an embodiment, the 3D imager comprises a controller that controls intensity of light provided by the 3D imager to illuminate the active space responsive to distance of features in the active space that are imaged by the 3D imager.

By configuring a 3D imager in accordance with an embodiment of the invention, so that it comprises near and far TOF cameras having respectively wide-angle and narrow-angle FOVs, the 3D imager has a relatively large active space. The 3D imager images features substantially anywhere in the space at a same relatively high spatial resolution without having to use conventional zoom optics.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale FIG. 1 schematically shows a plan view of a 3D imager comprising first and second TOF cameras and an active space of the imager provided by the FOVs of the TOF cameras, in accordance with an embodiment of the invention.

DETAILED DESCRIPTION

In the following text of the detailed description, aspects of a TOF 3D imager comprising a plurality of optionally two TOF cameras are discussed with reference to FIG. 1, which shows components of the TOF 3D imager and an active space provided by the FOVs of the TOF cameras. FIG. 2 schematically shows geometrical relationships between distance images acquired by pixels in the two TOF cameras for features in a same region of the active space of the TOF 3D imager shown in FIG. 1. The figure schematically shows uncertainties in distance measurements provided by the distance images and frequency distributions of the distance measurements provided by pixels in the TOF cameras that are assumed for convenience to be Gaussian. A method for determining distances to features in the active space using information provided by the two TOF cameras and for correlating pixels to determine which pixels in the two cameras correspond and image substantially same features in the active space are discussed with reference to FIG. 2 and to the flow diagram shown in FIGS. 3A and 3B.

Figure 1:
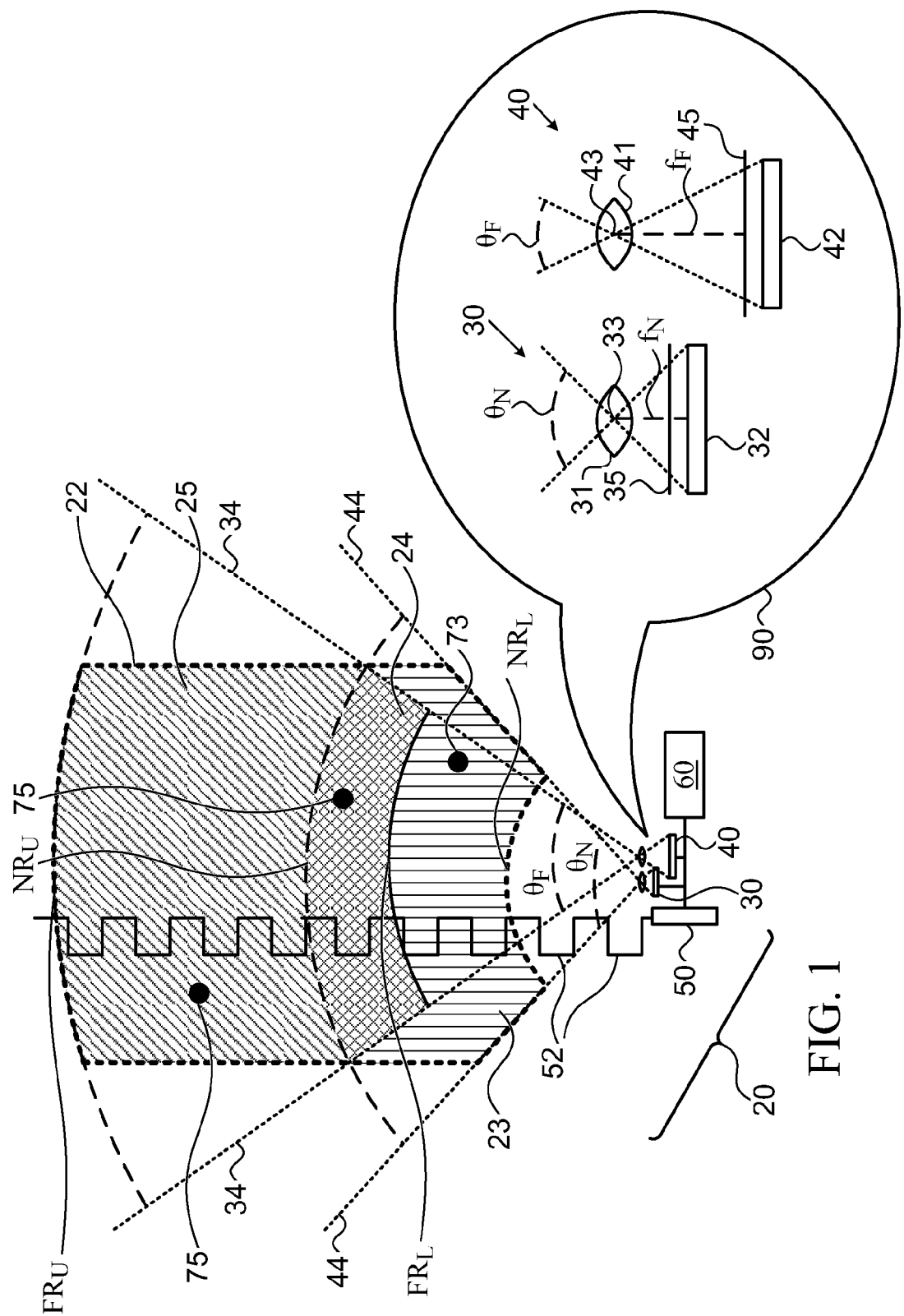
Figure 2:
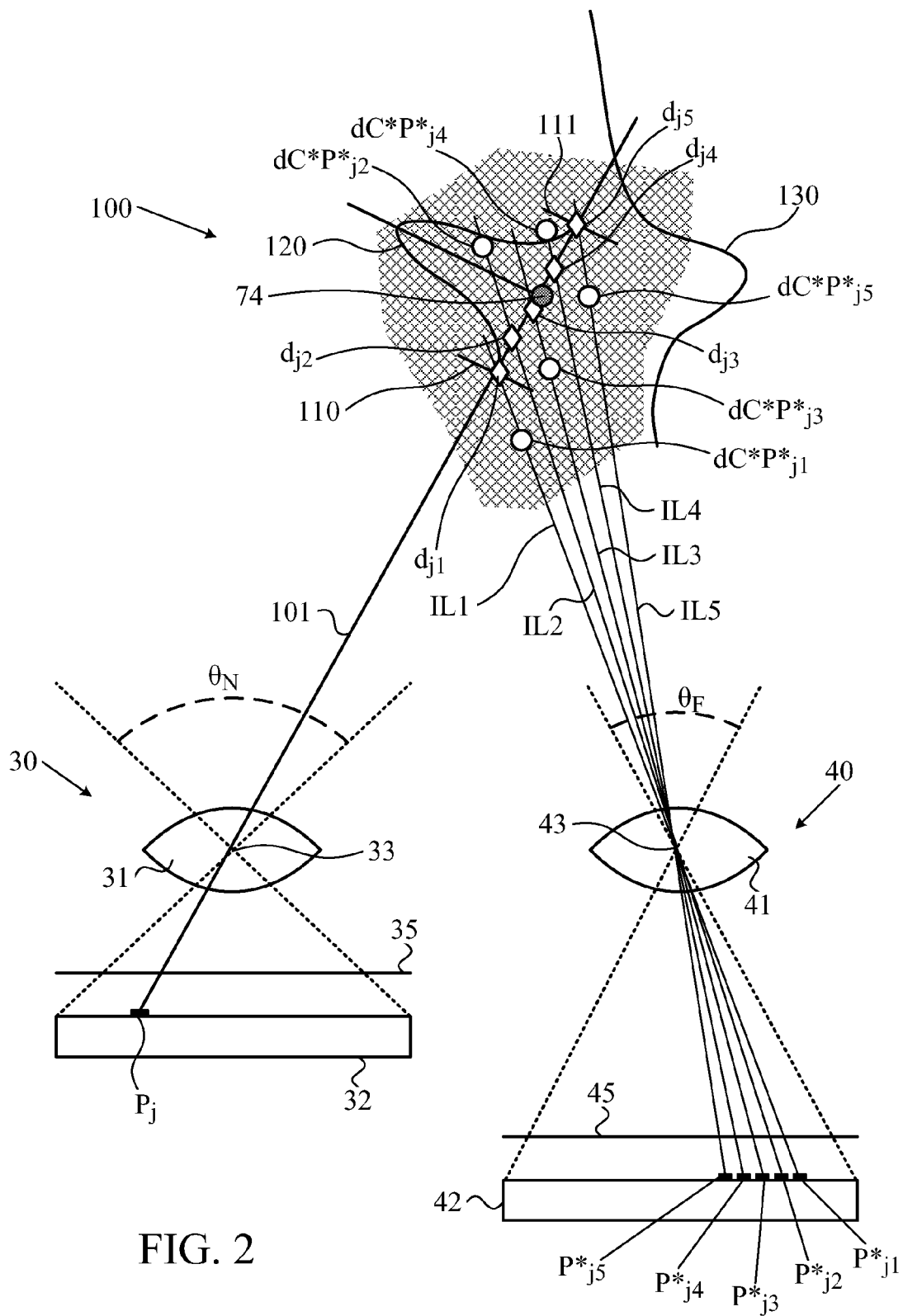
FIG. 2 schematically shows geometric relationships between distance images of features in a same region of the active space of the 3D imager show in FIG. 1 that are acquired by the TOF cameras and used to determine a distance to a feature in the active space, in accordance with an embodiment of the invention.

FIG. 1 schematically shows a plan view of a TOF 3D imager 20 comprising a near TOF camera 30, a far TOF camera 40, and a light source 50. Details of the TOF cameras are shown in an inset 90.

Near TOF camera 30 comprises an optical system represented by a lens 31 that collects light from objects imaged by the near TOF camera and images the collected light on a photosensor 32. Optical system 31 has an optical center 33 and a focal length N that together with photosensor 32 define a wide-angle FOV for the near TOF camera that is characterized by relatively large, optionally fixed, horizontal view angle $\theta_N$ defined by lines 44. Numeral 44 designating the lines that define view angle $\theta_N$ of the wide angle FOV of near TOF camera 30 is also used to refer to the FOV, which may be referred to as "near FOV", of the near TOF camera 30. Optical system 31 also includes a shutter 35 for shuttering near TOF camera 30 open and closed.

Similarly, far TOF camera 40 comprises an optical system represented by a lens 41 that collects light from objects in the camera's FOV and images the collected light on a photosensor 42. The optical system has an optical center 43 and a focal length $f_F$ that together with photosensor 42 define a narrow-angle FOV for the far TOF camera that is characterized by relatively large, optionally fixed, horizontal view angle $\theta_F$ defined by lines 34. Numeral 34 designating the lines that define view angle $\theta_F$ of the wide angle FOV of far TOF camera 40 is also used to refer to the FOV, which may be referred to as "far FOV", of the far TOF camera. Optical system 41 also includes a shutter 45 for shuttering far TOF camera open and closed.

Light source 50 is controllable by a controller 60 to radiate a train of light pulses to illuminate objects in near and far FOVs 44 and 34. Light pulses radiated by light source 50 are schematically represented by square "pulses" labeled with a numeral 52. Whereas light pulses 52 may comprise light provided by a suitable light emitting diode (LED) and/or laser from any portion of the spectrum, usually, light pulses 52 are near infrared (NIR) light pulses.

Following a predetermined delay, $\tau_{ND}$, from a time at which each light pulse 52 in the train of light pulses is radiated by light source 50 to illuminate objects in near and far FOVs 44 and 34, controller 60 controls near shutter 35 to shutter open near TOF camera 30 for a short exposure period having duration $\tau_N$. During the exposure period, light reflected from the light pulse by features in near FOV 44 that reaches near TOF camera 30 is imaged by lens 31 onto photosensor 32. The imaged light is registered by the near TOF camera and is used to determine how long it takes light in light pulse 52 to travel round trip from light source 50 to the features and back to near TOF camera 30. The round trip time and the speed of light are used to determine how far the features are from the near TOF camera and therefore from TOF 3D imager 20.

Similarly, controller 60 controls shutter 45 in far TOF camera 40 to shutter open the far TOF camera for a short exposure period having duration $\tau_F$ following a delay $\tau_{FD}$ after each pulse 52 is radiated by light source 50. The far TOF camera images and registers light reflected from the light pulse that reaches the far TOF camera during the exposure period and uses the registered light to determine distances from TOF 3D imager 20 to features in far FOV 34.

Far TOF camera 40, because of its narrow-angle FOV 34, images features farther from TOF 3D imager 20 with better spatial resolution than near TOF camera 30, but images a relatively small volume of space near to TOF 3D imager 20. On the other hand, near TOF camera 30, because of its relatively wide-angle FOV 44 is able to image a relatively large volume of space near to TOF 3D imager 20 and may be configured to image close features with acceptable spatial resolution.

In accordance with an embodiment of the invention, to combine near and far FOVs 44 and 34 to provide an advantageous active space for TOF 3D imager 20, and to determine how to use distance information provided by near and far TOF cameras 30 and 40, imaging range lower and upper bounds are established for near and far TOF cameras 30 and 40. Let the lower and upper range bounds associated with near TOF camera 30 be represented by $NR_L$ and $NR_U$ respectively. The lower and upper bounds for near TOF camera 30 are schematically shown in FIG. 1 by dashed lines that are labeled $NR_L$ and $NR_U$. Let the lower and upper range bounds associated with far TOF camera 40 be represented by $FR_L$ and $FR_U$ respectively. The lower and upper bounds for far camera 40 are schematically shown in FIG. 1 by dashed lines that are labeled $FR_L$ and $FR_U$.

View angles $\theta_N$ and $\theta_F$, and range bounds $NR_L$, $NR_U$, $FR_L$, and $FR_U$ optionally define an active space schematically outlined by a bold dashed line 22 for TOF 3D imager 20. Numeral 22 that labels the dashed lines that outline the active space of TOF 3D imager 20 is also used to refer to the active space.

In an embodiment of the invention, view angle $\theta_N$ for wide-angle FOV 44 of near TOF camera 30 is determined so that active space 22 has an advantageous width close to TOF 3D imager 20. Near and far upper bounds $NR_U$ and $FR_U$ and view angle $\theta_F$ for narrow-angle FOV 34 of far TOF camera 40 are determined so that near and far TOF cameras 30 and 40 image objects at distances $NR_U$ and $FR_U$ respectively with substantially a same spatial resolution. Assuming, by way of illustrative example, that photosensors 32 and 42 have substantially a same pixel size, then near and far TOF cameras 30 and 40 respectively image objects at distances $NR_U$ and $FR_U$ with a substantially same spatial resolution, if $\tan[\theta_F/2] = (NR_U/FR_U) \tan[\theta_N/2]$ By way of a numerical example, assume that near and far TOF cameras 30 and 40 have photosensors 32 and 42 comprising an array of 640×480 pixels and that the pixels have a diagonal length of 5.6 µm (micrometers). If $NR_U$=200 cm and $FR_U$=300 cm, near and far TOF cameras 30 and 40 will resolve features separated by about 0.5 cm at distances 200 cm and 300 cm respectively if their FOV angles $\theta_N$ and $\theta_F$ are respectively equal to about 74° and about 53°.

To provide a smoothly continuous active space 22 and to facilitate spatial registration of images provided by near and far TOF cameras 30 and 40, lower bound range $FR_L$ for far TOF camera 40 and upper bound range $NR_U$ for near TOF camera 30 are determined so that $FR_L < NR_U$. Active space 22 therefore comprises three zones: a near zone 23, an intermediate zone 24 and a far zone 25.

By way of a numerical example assume that an active space, for example for playing full-body 3D computer games active space 22 advantageously extends from $NR_L$ equal to about 0.80 m to $FR_U$ equal to about 3 m from TOF 3D imager 20. If at 0.80 m from the TOF 3D imager 20 active space 22 is about 1 m wide, then advantageously, near TOF camera 30 has a view angle $\theta_N$ equal to about 62.5°. If at a distance $NR_U$ from TOF 3D imager 20 active space 22 advantageously has a width of about 2.5 m then $NR_U$ is equal to about 2 m and $\theta_F$=arctan $[\theta_F/2]$=arctan$((NR_U/FR_U) \tan[\theta_N/2]\theta_F)$ is equal to about 42°. If the near and far TOF cameras have square pixels that are 15 µm on a side and are advantageously able to resolve features separated by about 1 cm at distances $NR_U$ and $FR_U$ then their focal lengths N and $f_F$ are advantageously equal to about 30 mm (millimeters) and 45 mm respectively.

Controller 60 controls TOF 3D imager 20 and processes distance information provided by distance images acquired by near and far TOF cameras 30 and 40 responsive to the lower and upper bounds $N_{RL}$, $N_{RU}$, $F_{RL}$, and $F_{RU}$ and zones 23, 24 and 25 that they define. In an embodiment of the invention, controller 60 controls TOF 3D imager 20 using a delay $\tau_{ND}$ and duration of exposure period $\tau_N$ for near TOF camera 30 substantially equal respectively to delay $\tau_{FD}$ and exposure period $\tau_F$ for far TOF camera 40. Under these conditions of substantial equality, both TOF cameras acquire images for features in active space 22 over a same range of distances from the TOF 3D imager.

In an embodiment of the invention, controller 60 shutters far TOF camera 40 with $\tau_{FD}$ and $\tau_F$ determined so that far TOF camera 40 images a feature present in far FOV 34 with light from light source 50 only if the feature's distance from the near TOF camera is between $FR_L$ and $FR_U$. Similarly, the controller shutters near TOF camera 30 with $\tau_{ND}$ and $\tau_F$ determined so that near TOF camera 30 images a feature present in near FOV 44 with light from light source 50 only if the feature's distance from the near TOF camera is between $NR_L$ and $NR_U$.

Generally, controller 60 may provide acceptable distance measurements for features in zone 23 using distance images provided only by near TOF camera 30. Generally, controller 60 may provide acceptable distance measurements for features in zone 25 using distance images provided only by far TOF camera 40. For features that are located in intermediate zone 24 or for an apparently invalid or indeterminate distance provided by one of the TOF cameras, the controller optionally uses data provided by both near and far TOF cameras. Solid circles 73, 74 and 75 schematically represent by features at locations in zones 23, 24 and 25

For a distance to a feature that is determined from distance images from both near and far TOF cameras 30 and 40, controller designates one of the TOF cameras as a "prime" TOF camera. For convenience of presentation, in the description below of how information from the TOF cameras is used in accordance with an embodiment of the invention, the letter "C" represents the prime camera. The letter C* represents the other camera, which may be referred to as a "secondary" camera. It is assumed that distance from TOF 3D imager 20 is to be determined for a feature imaged on a pixel $P_j$ of the prime camera C. By way of example, in the following discussion referencing FIG. 2, the prime camera is assumed to be near TOF camera 30, and the feature imaged on pixel $P_j$ is assumed to be feature 74 shown in FIG. 1 located in intermediate zone 24.

FIG. 2 schematically shows a greatly enlarged view of near and far TOF cameras 30 and 40, a region 100 of intermediate zone 24 in which feature 74 is located and pixel $P_j$ on which feature 74 is imaged on photosensor 32 of prime camera C, near TOF camera 30.

In accordance with an embodiment of the invention, feature 74 is assumed to be constrained to lie along a line in space, an imaging line 101, also referred to as a prime imaging line 101, that passes from the feature through optical center 33 of near TOF camera 30 and intersect pixel $P_j$. A trail distance for feature 74 is a distance "$dCP_j$" determined from the distance image of feature 74 acquired by pixel $P_j$. A distance "d" along prime imaging line 101 is assumed to be an actual distance along the imaging line at which feature 74 is located with a probability given by a probability distribution function $\mathcal{P}(d;dCP_j,\sigma_j)$, where $\sigma_j$ is a measure of an error associated with trial distance $dCP_j$. Shot and read noise typically generate an error associated with a trail distance. A segment of imaging line 101 between witness lines 110 and 111 schematically represents a magnitude of an error associated with $dCP_j$. In FIG. 2, probability distribution $\mathcal{P}(d;dCP_j,\sigma_j)$ is assumed to be a normal distribution represented by a curve 120 shown along imaging line 101 having a maximum at distance $dCP_j$ and a standard deviation $\sigma_j$.

In accordance with an embodiment of the invention, for each of a plurality of M regions $R_{jm}$, ($1 \leq m \leq M$), along imaging line 101, at distances $d_{jm}$ between witness lines 110 and 111, a pixel $P^*_{jm}$ in photosensor 42 of far TOF camera 40 is determined on which region $R_{jm}$ would be imaged, were it located in the region. In FIG. 2 M is arbitrarily shown equal to five. Regions $R_{jm}$ are schematically indicated along the segment of prime imaging line 101 between witness lines 110 and 111 by diamond icons labeled by corresponding distances $d_{j1}, d_{j2}, \ldots d_{j5}$, corresponding respectively to $R_{j1}, R_{j2}, \ldots R_{j5}$.

Pixel $P^*_{jm}$ lies at an end of an imaging line $IL_m$, hereinafter also referred to as a secondary imaging line $IL_m$ that extends from $d_{jm}$ through optical center 43 of secondary camera, far TOF camera 40. Assume that a distance image acquired by pixel $P^*_{jm}$ provides a distance $dC^*P^*_{jm}$ along its associated imaging line $IL_m$ for a feature imaged on the pixel, and that the distance $dC^*P^*_{jm}$ is associated with an error $\sigma^*_{jm}$. Distances $dC^*P^*_{jm}$ are graphically represented by circle icons labeled by distances $dC^*P^*_{jm}$, ($1 \leq m \leq 5$) along secondary imaging lines $IL_m$.

Let a probability that a distance $d^*_m$ along imaging line $IL_m$ for the feature imaged on pixel $P^*_{jm}$ is the actual distance for the feature be given by a probability distribution function $\mathcal{P}(d^*_m; dC^*P^*_{jm}, \sigma^*_{jm})$. In FIG. 2 an exemplary distribution $\mathcal{P}(d^*_{jm}; dC^*P^*_{jm}, \sigma^*_{jm})$ is shown as a normal distribution 130 for m=5. If the intersection of prime imaging line 101 with secondary imaging line $IL_m$ is located at a distance $d^*_{jm}$ along imaging line $IL_m$ from far TOF camera 40, a probability that the $d^*_{jm}$ is the actual distance of the feature imaged on pixel $P^*_{jm}$ from far camera 40 is $\mathcal{P}(d^*_{jm}; dC^*P^*_{jm}, \sigma^*_{jm})$.

In accordance with an embodiment of the invention, controller 60 determines that a distance $DCP_j$ for the feature, for example feature 74, imaged on pixel $P_j$ of prime, near TOF camera 30, is a distance $d_m$ ($1 \leq m \leq M$) that maximizes: $\mathcal{P}(d_m;dCP_j,\sigma_j) \cdot \mathcal{P}(d^*_{jm};dC^*P^*_{jm},\sigma^*_{jm})$.

It is noted that whereas in the discussion above, near TOF camera 30 is designated the prime camera and far TOF camera 40 the secondary camera, the procedure for determining distance is generally substantially independent of which camera is the prime camera. The roles of the cameras may be reversed, with far TOF camera 40 designated the prime camera and near TOF camera the secondary camera and prime imaging line 101 associated with the far TOF camera.

Figure 3A:
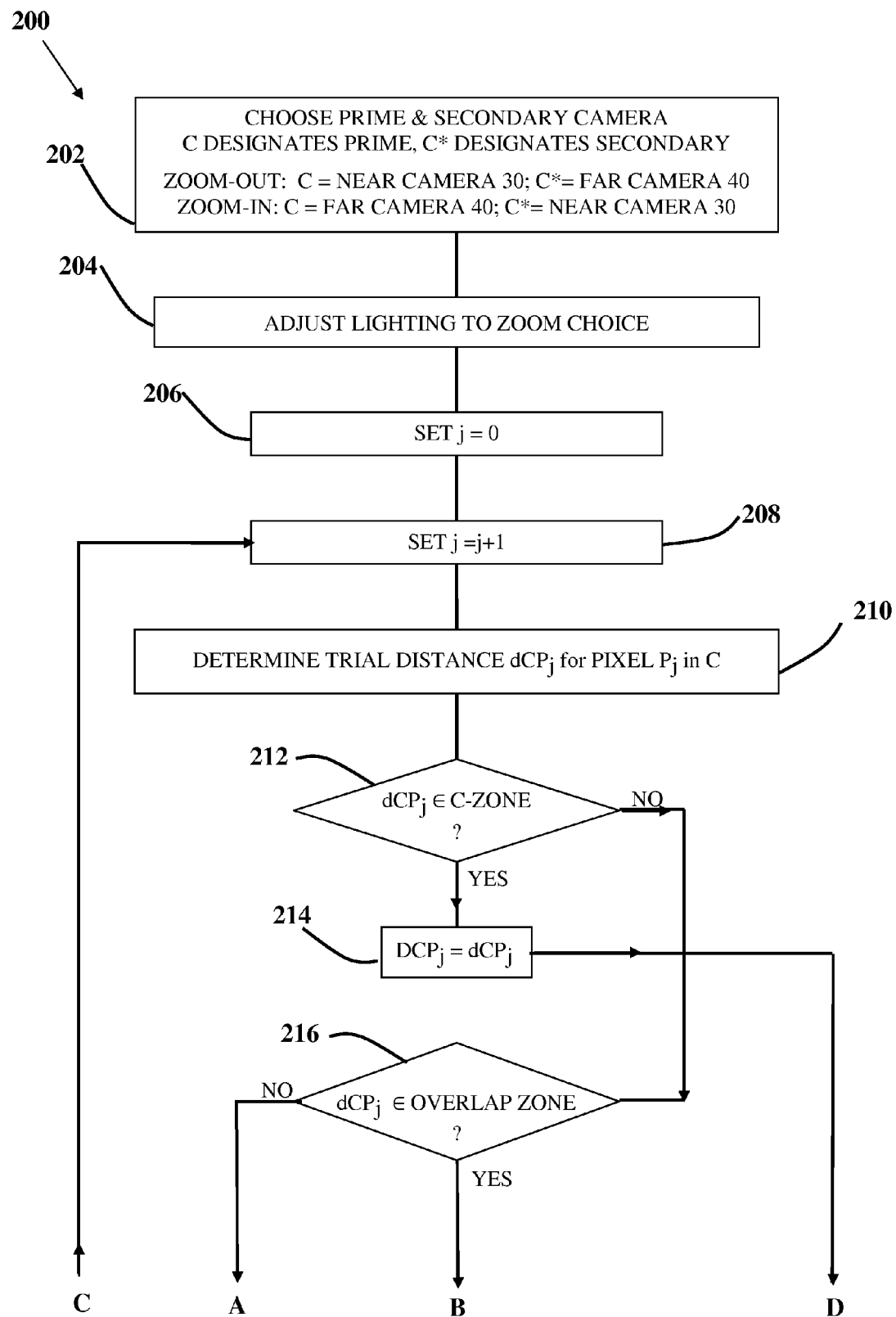
FIGS. 3A and 3B show a flow diagram of an algorithm for determining distance to a feature in the active space, in accordance with an embodiment of the invention.
Figure 3B:
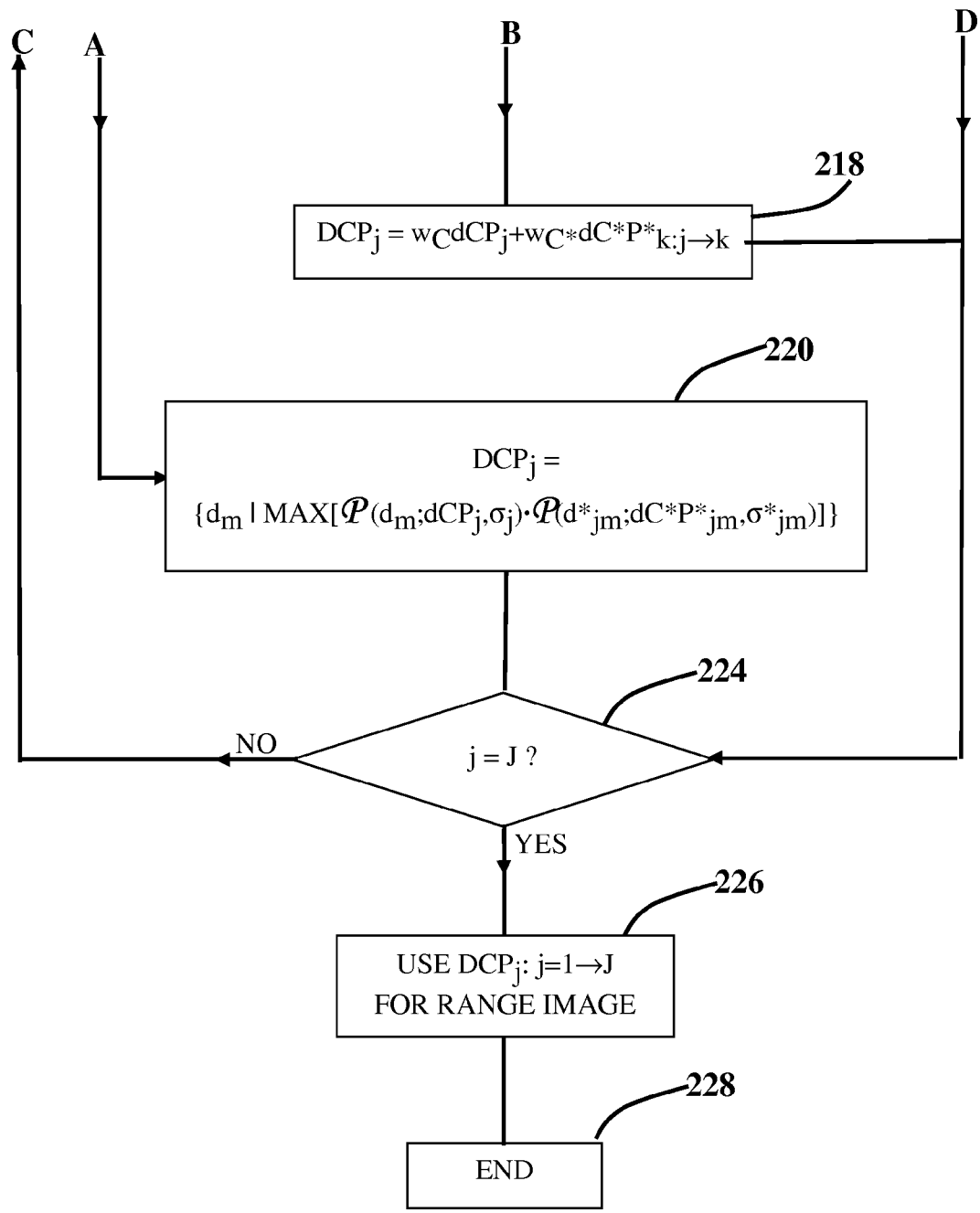

FIGS. 3A and 3B show a flow diagram 200 of an algorithm, also referred to by the numeral 200, by which TOF 3D imager 20 processes information from images of active space 22 acquired by near and far TOF cameras 30 and 40 to determine distances to features in active space 22 and provide a range image for features in the active space.

In a block 202, optionally controller 60 determines whether to adjust TOF 3D imager 20 to operate in a zoom-out mode or in a zoom-in mode. Adjusting the TOF 3D imager comprises determining which camera, near TOF camera 30, (the wide-angle FOV, zoom-out camera) or far TOF camera 40 (the narrow-angle FOV, zoom-in camera), is designated the prime camera for processing distance information provided by the cameras. The discussion above with respect to FIG. 1 provides an example of a role of a prime camera in determining distances to features in active space 22 (FIG. 1). Optionally, to determine which camera is advantageously designated the prime camera, controller 60 estimates from distances provided by near and far TOF cameras 30 and 40 a number of features of interest present in each of near, overlap and far zones zones 23, 24, and 25 in active space 22. The controller determines zoom-in or zoom-out in response to the estimated numbers of features.

For example, if there is a preponderance of features in the near or far zones 23 or 25, controller 60 adjusts TOF 3D imager 20 to operate in a zoom-in mode with near TOF camera 30 the prime camera, or zoom-out mode with far TOF camera 40 the prime camera, respectively. Optionally, if a preponderance of features of interest is found present in the intermediate zone, controller 60 leaves the TOF 3D imager operating in a zoom mode in which it was operating prior to estimating the number of features of interest or determines the zoom mode in accordance with a predetermined default procedure.

In a block 204 controller 60 sets intensity of light pulses radiated by light source 50 to match the choice of zoom-mode. If the zoom mode is zoom-out, the controller optionally sets the intensity to a moderate level to reduce the probability that features in near zone 23 close to TOF 3D imager 20 may reflect amounts of light from the light pulses back to near and far TOF cameras 30 and 40 that saturates pixels in the TOF cameras. If the zoom mode is zoom-in, controller 60 optionally sets the intensity of radiated pulses greater than the moderate intensity chosen for the zoom-out mode to reduce a probability that features in far zone 25, relatively far from TOF 3D imager 20, do not reflect sufficient light back to the TOF cameras for acceptable imaging. An intermediate intensity is optionally determined for a situation where a relatively large number of features of interest are found in intermediate zone 24.

In a block 206 the controller initializes to zero an index "j" that designates pixels in prime camera C, which may be either near TOF camera 30 or far TOF camera 40. Index j has a maximum value equal to J, which represents a total number of pixels in near TOF camera 30. In a block 208, the controller increases the index by one. In a block 210, controller 60 determines a trail distance $dCP_j$ from a distance image acquired by pixel $P_j$ in prime camera C for a feature in active space 22. In a decision block 212, controller 60 determines if the value for $dCP_j$ indicates whether the feature imaged on pixel $P_j$ is located in the zone, hereinafter also referred to as a "C-zone", in active space 22 that is associated with prime camera C. That is, if near TOF camera 30 is the prime camera C, the C-zone is near zone 23 (FIG.

1), and if far TOF camera 40 is the prime camera C, the C-zone is far zone 25. If the imaged features appears to be in the C-zone, in a block 214 the controller determines that, optionally, a distance $DCP_j=dCP_j$ is the distance for the feature imaged on pixel $P_j$ of the prime camera C.

The controller then, optionally, proceeds to a block 224 and determines if j=J, the total number of pixels in prime camera C. If j is not equal to J, controller 60 returns to block 208 to increase index j by one and proceed to determine a distance for a feature imaged on a next pixel $P_{(j+1)}$. If j=J, controller 60 ends the process for determining distances for the pixels $P_j$ in prime camera C, and optionally in a block 226 it uses the distances $DCP_j$ j=1→J to provide a range image for active space 22. The controller then optionally proceeds to a block 228 to end the process.

In an embodiment of the invention, if the feature is not in the C-zone, the controller optionally determines in a decision block 216 whether the trial distance $dCP_j$ indicates if the feature imaged on pixel $P_j$ appears to be located in intermediate zone 24. If it is, optionally in a block 218, controller 60 uses distance information from both prime camera C and secondary camera C* to determine a distance $DCP_j$ for the feature imaged on $P_j$. Optionally, the controller determines from the geometry of near and far TOF cameras 30 and 40 and their positions relative to each other in TOF 3D imager 20, which pixel $P^*_{k:j\rightarrow k}$ corresponds to pixel $P_j$, and images substantially a same feature that pixel $P_j$ images. Optionally, the controller determines the distance $DCP_j$ as a weighted average of the trail distance $dCP_j$ and the trial distance $dCP^*_{k:j\rightarrow k}$ provided by the distance image acquired by pixel $P^*_{k:j\rightarrow k}$ in accordance with an equation $DCP_j=w_C dCP_j + w_C^* dC^*P^*_{k:j\rightarrow k}$, where $w_C$ and $w_C^*$ are weighting factors. The weighting factors may for example weigh information from the prime camera C more than information from the secondary camera C*, or weigh the trial distances by a function of their respective errors. After determining $DCP_j$, controller 60 optionally continues from block 218 to block 208 via a decision block 224 to increase index j or to block 226 to provide a range image for active space 22 and proceed to block 228 to end the process.

If in block 216 controller 60 finds that trial distance $dCP_j$ does not indicate that the feature is located in intermediate zone 24 then either the trial distance indicates that the feature is located in C*-zone, the zone in active space 22 associated with secondary camera C*, or the trial distance is invalid and the controller proceeds optionally to a block 220. Optionally, the controller executes a procedure similar to that described above with reference to FIG. 2 and determines $DCP_j$ in accordance with an expression $DCP_j=\{d_m|MAX[\mathcal{P}(d_m;dCP_j,\sigma_j)\cdot\mathcal{P}(d^*_{jm};dC^*P^*_{jm},\sigma^*_{jm})]\}$.

From block 220 the controller optionally proceeds to block 224 and thereafter to return to block 208 to repeat the procedure for a next pixel in prime camera C, or to block 226 to provide a range image and then end the procedure.

If of course TOF 3D imager 20 is in continuous operation, for example in support of a full body 3D computer game, to repeatedly image features in active space 22, controller may proceed to repeatedly execute algorithm 200 for each set of images acquired for the active space during the game.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A three-dimensional (3D) imaging system that images features in an active space and determines distances to the features, the imaging system comprising:
   a light source that illuminates the active space with at least one light pulse;
   first and second three dimensional (3D) cameras having optical centers and comprising first and second photosensors respectively having pixels on which the cameras image light reflected from the at least one light pulse to acquire distance images of the features, wherein the first and second 3D cameras have wide-angle and narrow-angle fields of view (FOVs) respectively, which overlap to provide the active space and each camera is operable to acquire distance images of the features in the active space independent of the other 3D camera;
   a plurality of range bounds that divide the active space into zones, the range bounds comprising a near range upper bound, "$NR_U$", and a far range lower bound "$FR_L$"; and
   a controller that processes the distance images responsive to the zones to determine distances to the features.

2. The 3D imaging system according to claim 1 wherein the range bounds satisfy a relationship $FR_L<NR_U$ and divide the active space into near, intermediate, and far zones, for which distances to features in the active space are less than $FR_L$, between $FR_L$ and $NR_U$, and greater than $NR_U$ respectively.

3. The 3D imaging system according to claim 2 wherein to provide a range image comprising distances to features in the active space, the controller:
   designates one of the 3D cameras a prime camera and the other a secondary camera;
   determines for each of a plurality of pixels in the prime camera a trial distance for a feature in the active space that is imaged on the pixel;
   determines the distance to the feature to be the trial distance if the prime camera is the first camera and the determined distance is in the near zone or the prime camera is the second camera and the trial distance is in the far zone;
   determines the distance responsive to the trial distance and a distance provided by a pixel in the secondary camera if the prime camera is the first camera and the determined distance is not in the near zone or the prime camera is the second camera and the trial distance is not in the far zone; and
   uses the distances determined for the pixels in the prime camera for the distances in the range image.

4. The 3D imaging system according to claim 3 wherein the trial distance lies in the intermediate zone.

5. The 3D imaging system according to claim 4 wherein the controller determines the distance to the feature as an average of the trial distance and the distance provided by the pixel in the secondary camera.

6. The 3D imaging system according to claim 5 wherein the average is a weighted average.

7. The 3D imaging system according to claim 3 wherein the prime camera is the first camera and the trial distance lies in the far zone or the prime camera is the second camera and the trial distance lies in the near zone.

8. The 3D imaging system according to claim 7 wherein the controller determines which pixels in the secondary camera image points along a line that passes through the pixel in the prime camera and the optical center of the prime camera.

9. The 3D imaging system according to claim 8, wherein the controller determines a distance for each of the determined pixels in the secondary camera responsive to a distance image acquired by the pixel with light from the at least one light pulse.

10. The 3D imaging system according to claim 9 wherein the controller determines a probability distribution that a given distance along a line that passes through the optical center of the secondary camera and the determined pixel is an actual distance of the feature imaged on the determined pixel from the secondary camera.

11. The 3D imaging system according to claim 10 wherein the controller determines a probability distribution that a given distance along the line in the prime camera is an actual distance of the feature imaged on the prime camera pixel from the prime camera.

12. The 3D imaging system according to claim 11 wherein the controller uses the probability distributions determined for the given distances from the prime camera and the secondary camera to determine a distance of the feature imaged on the prime camera pixel from the prime camera.

13. The 3D imaging system according to claim 1 wherein a camera of the first and second 3D cameras is a time of flight (TOF) camera.

14. A method of determining distance to features located in an active space, the method comprising:
    illuminating the active space with at least one light pulse;
    imaging features in the active space using first and second three dimensional (3D) cameras having optical centers and comprising first and second photosensors respectively having pixels on which the cameras image light reflected from the at least one light pulse to acquire distance images of the features, wherein the first and second 3D cameras have wide-angle and narrow-angle fields of view (FOVs) respectively, which overlap to provide the active space, and each camera is operable independent of the other to acquire distance measurements for the features in the active space;
    dividing the active space into zones delimited by a plurality of range bounds the range bounds comprising a a near range upper bound, "$NR_U$", and a far range lower bound "$FR_L$"; and
    processing the distance images responsive to the zones to determine distances to the features.

15. A method according to claim 14 wherein the range bounds satisfy a relationship $FR_L < NR_U$ and divide the active space into near, intermediate, and far zones, for which distances to features in the active space are less than $FR_L$, between $FR_L$ and $NR_U$, and greater than $NR_U$ respectively.

16. The method according to claim 15 and comprising:
    designating one of the 3D cameras a prime camera and the other a secondary camera;
    determining for each of a plurality of pixels in the prime camera a trial distance for a feature in the active space that is imaged on the pixel;
    determining the distance to the feature to be the trial distance if the prime camera is the first camera and the determined distance is in the near zone or the prime camera is the second camera and the trial distance is in the far zone;
    determining the distance responsive to the trial distance and a distance provided by a pixel in the secondary camera if the prime camera is the first camera and the determined distance is not in the near zone or the prime camera is the second camera and the trial distance is not in the far zone; and
    using the distances determined for the pixels in the prime camera for the distances in the range image.

17. The method according to claim 16 wherein the trial distance lies in the intermediate zone.

18. The method according to claim 17 and determining the distance to the feature as an average of the trial distance and the distance provided by the pixel in the secondary camera.

19. A 3D imaging system that images features in an active space and determines distances to the features, the imaging system comprising:
    a light source that illuminates the active space with at least one light pulse;
    first and second three dimensional (3D) cameras having optical centers and comprising first and second photosensors respectively having pixels on which the cameras image light reflected from the at least one light pulse to acquire distance images of the features, wherein the first and second 3D cameras have wide-angle and narrow-angle fields of view (FOVs) respectively, which overlap to provide the and divide the active space into zones, in which the overlap region is an intermediate range zone located between a near range zone and a far range zone, and each 3D camera is operable to acquire distance images of the features in the active space independent of the other 3D camera; and
    a controller that processes the distance images responsive to the zones to determine distances to the features.

20. The 3D imaging system according to claim 19 wherein the first and second 3D cameras are different types of 3D cameras.

* * * * *